(12) United States Patent
Ogino et al.

(10) Patent No.: US 9,783,018 B2
(45) Date of Patent: Oct. 10, 2017

(54) VEHICLE HEIGHT ADJUSTMENT APPARATUS

(71) Applicant: AISIN SEIKI KABUSHIKI KAISHA, Kariya-shi, Aichi-ken (JP)

(72) Inventors: Atsuto Ogino, Chiryu (JP); Takanori Suzuki, Nisshin (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 0 days.

(21) Appl. No.: 15/071,940

(22) Filed: Mar. 16, 2016

(65) Prior Publication Data

US 2016/0280034 A1    Sep. 29, 2016

(30) Foreign Application Priority Data

Mar. 27, 2015   (JP) ................................. 2015-067501

(51) Int. Cl.
  *B60G 17/016* (2006.01)
  *B60G 17/015* (2006.01)
  *B60G 11/27* (2006.01)
  *B60G 17/052* (2006.01)

(52) U.S. Cl.
  CPC .......... *B60G 17/0155* (2013.01); *B60G 11/27* (2013.01); *B60G 17/052* (2013.01); *B60G 2500/30* (2013.01); *B60G 2800/01* (2013.01)

(58) Field of Classification Search
  CPC ................................................ B60G 17/0155
  See application file for complete search history.

(56) References Cited

U.S. PATENT DOCUMENTS

| | | | | |
|---|---|---|---|---|
| 5,461,564 A | * | 10/1995 | Collins | ............ B60G 17/01933 280/5.514 |
| 6,959,932 B2 | * | 11/2005 | Svartz | .................... B60G 9/003 280/124.157 |
| 7,724,817 B2 | * | 5/2010 | Pietraski | ........... H04L 25/03019 375/232 |
| 8,437,911 B2 | * | 5/2013 | Lanzilotta | ............ B60G 17/018 701/37 |

(Continued)

FOREIGN PATENT DOCUMENTS

JP            4517897 B2     8/2010

*Primary Examiner* — Adam Tissot
*Assistant Examiner* — Michael Berns
(74) *Attorney, Agent, or Firm* — Buchanan Ingersoll & Rooney PC

(57) ABSTRACT

A vehicle height adjustment apparatus includes: vehicle height adjustment units respectively provided to correspond to wheels of a vehicle body, and changing a vehicle height according to supply and discharge of a working fluid; a supply source of the working fluid; opening and closing valves interposed between the vehicle height adjustment units and the supply source; a control unit configured to execute vehicle height adjustment such that the vehicle height of the vehicle height adjustment units reaches a target vehicle height; and a storage unit configured to store state information indicating a changed state of an actual vehicle height with respect to a current target vehicle height, wherein the control unit modifies a subsequent target vehicle height when subsequent control is executed, based on the state information stored in the storage unit, and executes vehicle height adjustment.

4 Claims, 8 Drawing Sheets

(56) References Cited

U.S. PATENT DOCUMENTS

| | | | | |
|---|---|---|---|---|
| 8,521,361 B2* | 8/2013 | Larkins | ............... | B60G 17/018 |
| | | | | 280/5.5 |
| 9,517,674 B2* | 12/2016 | Chua | .................. | B60G 17/0525 |
| 2009/0033055 A1* | 2/2009 | Morris | ............... | B60G 17/0155 |
| | | | | 280/124.16 |

* cited by examiner

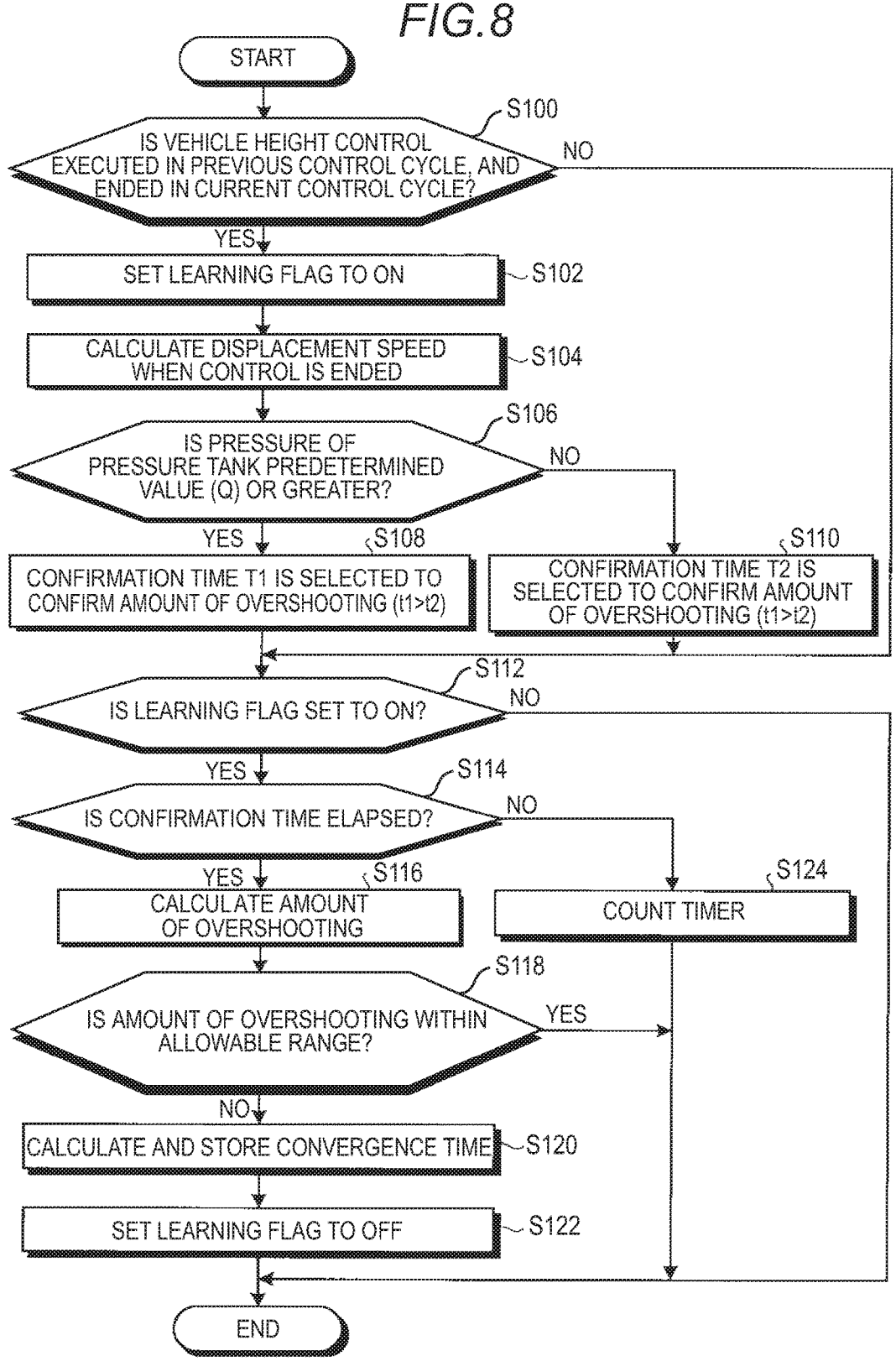

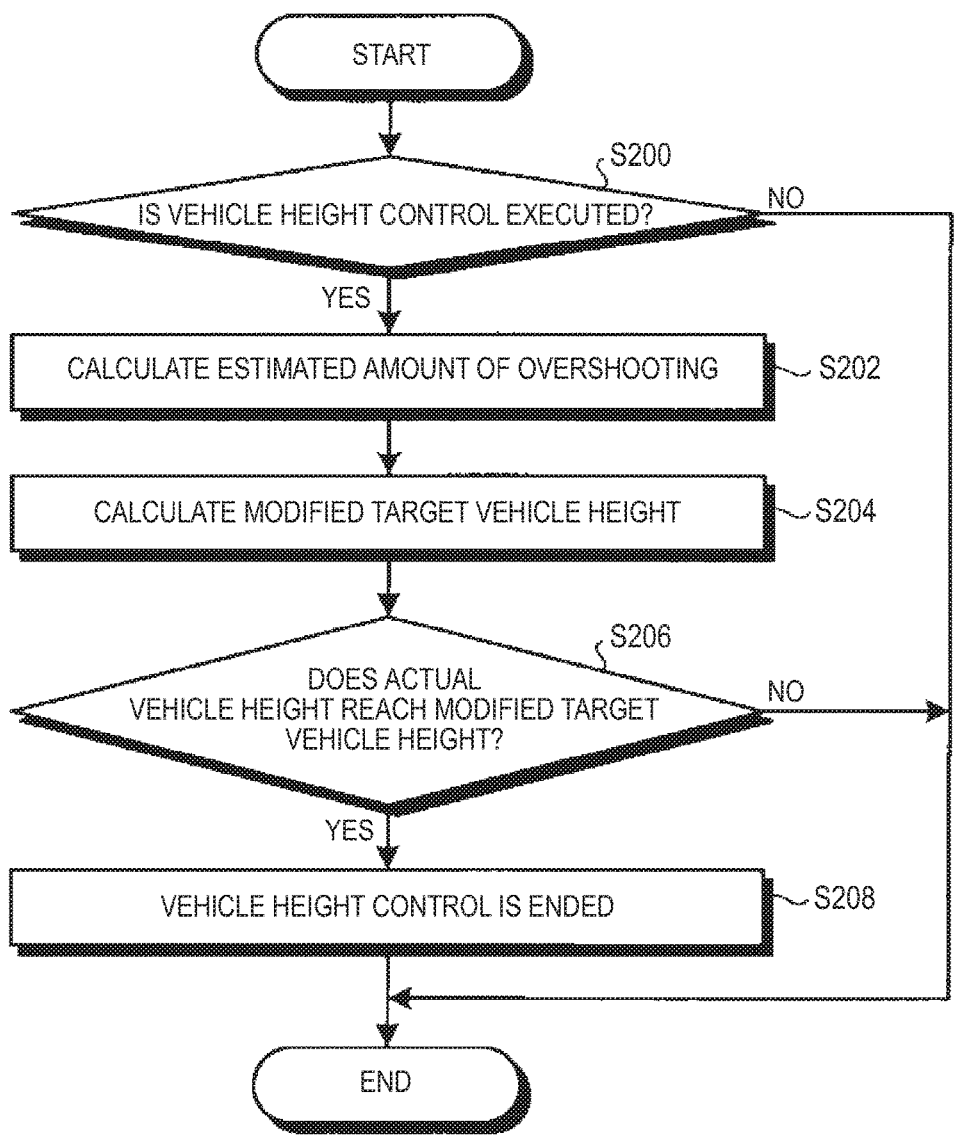

VEHICLE HEIGHT ADJUSTMENT APPARATUS

CROSS REFERENCE TO RELATED APPLICATIONS

This application is based on and claims priority under 35 U.S.C. §119 to Japanese Patent Application 2015-067501, filed on Mar. 27, 2015, the entire contents of which are incorporated herein by reference.

TECHNICAL FIELD

This disclosure relates to a vehicle height adjustment apparatus.

BACKGROUND DISCUSSION

In the related art, a vehicle may be equipped with a suspension including air springs using compressed air. A vehicle may also be equipped with a vehicle height adjustment apparatus using air springs. There is a so-called closed type vehicle height adjustment apparatus. This type of vehicle height adjustment apparatus increases a vehicle height by supplying a working fluid (high-pressure air) stored in a pressure tank to the air springs that change the suspension state of each wheel. The vehicle height adjustment apparatus decreases the vehicle height by discharging the working fluid from the air springs back to the pressure tank. In a case where the vehicle height is adjusted, first, a target vehicle height is determined, and the working fluid is supplied to or discharged from the air springs in order for the vehicle height to reach the target vehicle height. In a case where the vehicle height reaches the target vehicle height, opening and closing valves to control the supply and discharge of the working fluid are closed, and vehicle height control is ended. In contrast, even if the opening and closing valves are closed, the working fluid may continue to flow through flow paths such that the air springs continue to be extended and contracted. That is, an actual vehicle height may overshoot the target vehicle height. There is proposed control technology for reducing the difference between the actual vehicle height and the target vehicle height caused by overshooting. For example, there is a vehicle height adjustment apparatus that estimates the amount of overshooting based on masses before and after adjustment of a vehicle height, and performs vehicle height control while taking the amount of overshooting into consideration. Japanese Patent No. 4517897 is an example of the related art.

In the related technology, a relationship between a mass and the amount of overshooting is taken into consideration during a design phase. Due to assembly errors occurring when air springs are assembled into a vehicle, or aging of the air springs over time, suspension performance when the air springs are designed may be different from that of when the air springs are used in actuality. For this reason, even if the amount of overshooting is acquired (estimated) based on the relationship between the mass and the amount of overshooting which is prepared in advance, the amount of overshooting may not correlate to actual behavior, and reliability may be decreased. As a result, an adjustment based on the estimated amount of overshooting may deviate from a target, and an ultimately reached vehicle height (actual vehicle height) may not be easily brought close to a target vehicle height (final target vehicle height) to which the vehicle height is desired to be adjusted in actuality.

SUMMARY

Thus, a need exists for a vehicle height adjustment apparatus which is not susceptible to the drawback mentioned above.

A vehicle height adjustment apparatus according to an aspect of this disclosure includes: a plurality of vehicle height adjustment units that are respectively provided to correspond to wheels of a vehicle body, and change a vehicle height according to supply and discharge of a working fluid; a supply source of the working fluid; a plurality of opening and closing valves interposed between the vehicle height adjustment units and the supply source; a control unit configured to execute vehicle height adjustment via controlling of the opening and closing valves such that the vehicle height of the vehicle height adjustment units reaches a target vehicle height; and a storage unit configured to store state information indicating a changed state of an actual vehicle height with respect to a current target vehicle height after execution of current control by the control unit is ended, in which the control unit modifies a subsequent target vehicle height when subsequent control is executed, based on the state information stored in the storage unit, and executes vehicle height adjustment.

BRIEF DESCRIPTION OF THE DRAWINGS

The foregoing and additional features and characteristics of this disclosure will become more apparent from the following detailed description considered with the reference to the accompanying drawings, wherein:

FIG. 8 is a flowchart illustrating calculation of state information (convergence time of overshooting) and a learning sequence; and FIG. 9 is a flowchart illustrating the sequence of the subsequent (second or higher) vehicle height control.

DETAILED DESCRIPTION

Hereinafter, an exemplary embodiment of this disclosure will be disclosed. The configuration of the embodiment illustrated hereinafter, and operations and results (effects)

obtained by the configuration are simply given as an example. This disclosure can be realized by configurations other than the configuration disclosed in this embodiment, and various effects (including secondary effects as well) can be obtained by a basic configuration.

Figure 1:
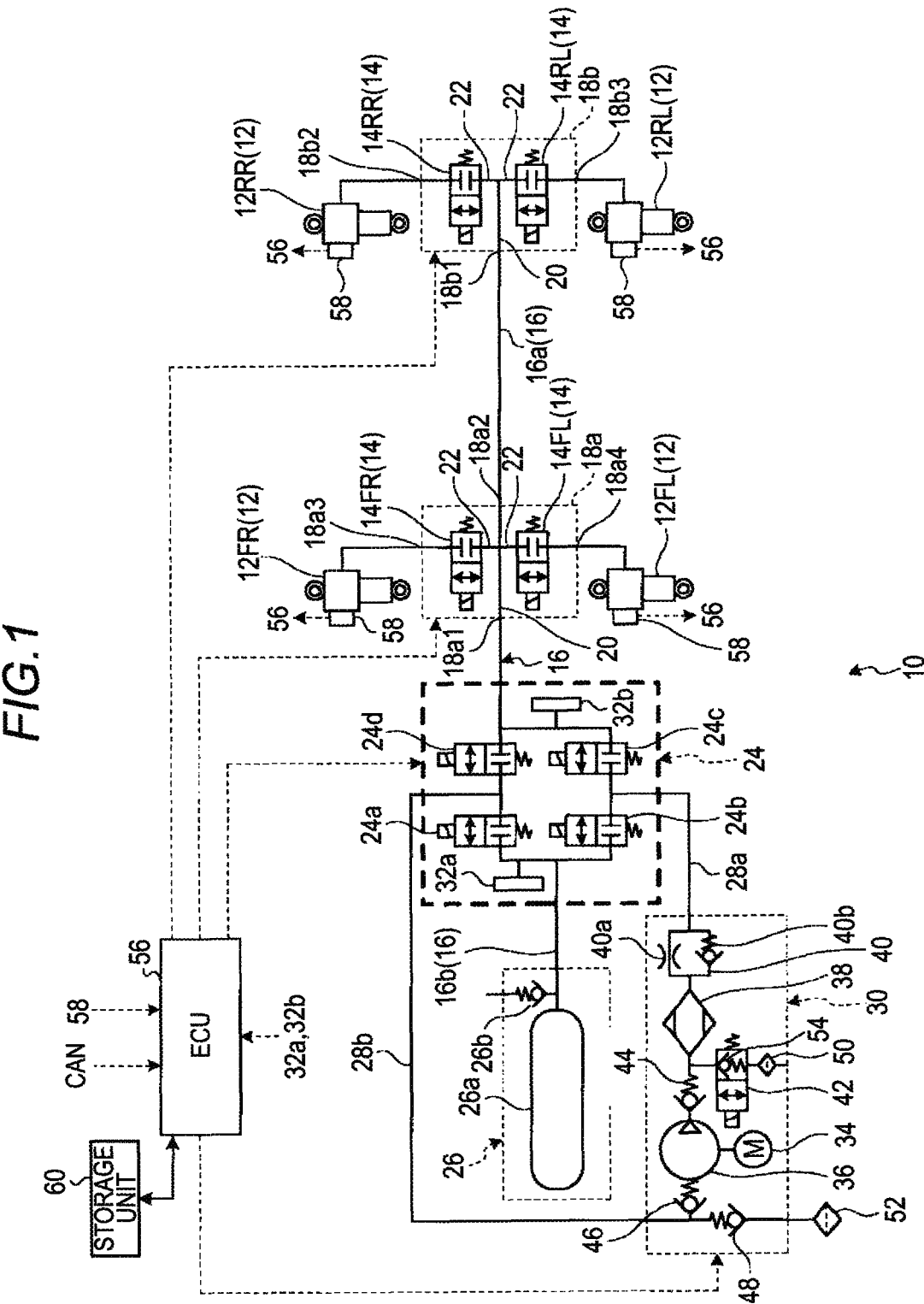
FIG. 1 is a diagram illustrating the configuration of a vehicle height adjustment apparatus in an embodiment, and illustrating a state in which a working fluid does not flow.

FIG. 1 is a diagram illustrating the configuration of a vehicle height adjustment apparatus 10 in the embodiment, and illustrating a state in which a working fluid does not flow.

Air springs 12FR, 12FL, 12RR, 12RL (hereinafter, also simply referred to as "air springs 12" in a case where it is not necessary to distinguish the air springs 12FR, 12FL, 12RR, 12RL from each other) serving as vehicle height adjustment units are respectively connected to the wheels of a vehicle which are not illustrated. The air spring 12 changes a suspension state of the wheel with respect to a vehicle body of the vehicle according to the supplying and discharging of the working fluid (for example, air). The air spring 12 has the function of absorbing vibration of the vehicle via the elasticity of compressed air sealed in the air spring 12. The air springs 12FR and 12FL may be referred to as front-wheel vehicle height adjustment units. The air springs 12RR and 12RL may be referred to as rear-wheel vehicle height adjustment units. A well-known structure can be used as the structure of the air spring 12. The air spring 12 easily absorbs minute vibrations compared to a metallic spring because the air spring 12 uses the elasticity of air. The vehicle height adjustment apparatus 10 can maintain a constant vehicle height, adjust the vehicle height to a desired height, or change a spring constant to a desired value by controlling air pressure.

The air springs 12FR and 12FL, which are the front-wheel vehicle height adjustment units, are connected to a main flow path 16, through which the working fluid flows, via respective vehicle height adjustment valves 14FR and 14FL. Similarly, the air springs 12RR and 12RL, which are the rear-wheel vehicle height adjustment units, are connected to the main flow path 16, through which the working fluid flows, via respective vehicle height adjustment valves 14RR and 14RL. The vehicle height adjustment valves 14FR, 14FL, 14RR, and 14RL may be simply referred to as "vehicle height adjustment valves 14" in a case where it is not necessary to distinguish the vehicle height adjustment valves 14FR, 14FL, 14RR, and 14RL from each other. In the embodiment, the air spring 12 and the vehicle height adjustment valve 14 may be collectively referred to as a vehicle height adjustment unit.

In the embodiment, the vehicle height adjustment valves 14FR and 14FL are disposed in a flow path block made of metal or resin, while being embedded in the flow path block, and form a front wheel valve unit 18a. Similarly, the vehicle height adjustment valves 14RR and 14RL are disposed in the flow path block while being embedded in the flow path block, and form a rear wheel valve unit 18b. In another embodiment, the vehicle height adjustment valves 14 may be disposed separately from each other. In this case, the degree of freedom in the layout of the vehicle height adjustment valves 14 is improved. The four vehicle height adjustment valves 14 may be integrated into one unit. In this case, it is possible to reduce the number of components by integrating the four vehicle height adjustment valves 14 into one unit.

As illustrated in FIG. 1, the front wheel valve unit 18a and the rear wheel valve unit 18b are formed as separate units, and thus, the front wheel valve unit 18a can be disposed on a front wheel side. As a result, it is possible to reduce the length of a flow path tube from the front wheel valve unit 18a to each of the air springs 12 of the front wheels compared to a case where all of the vehicle height adjustment valves 14 are integrated into one unit. Similarly, it is possible to dispose the rear wheel valve unit 18b on a rear wheel side, and to reduce the length of a flow path tube from the rear wheel valve unit 18b to each of the air springs 12 of the rear wheels compared to a case where all of the vehicle height adjustment valves 14 are integrated into one unit. As a result, it is possible to easily route the flow path tubes, and to reduce potential risk, for example, damage to the flow path tubes due to a reduction in the length of each of the flow path tubes.

A first port 18a1 is formed in one end surface of the front wheel valve unit 18a, and is connected to the main flow path 16. A main flow path channel 20 is formed inside the front wheel valve unit 18a in such a way as to pass through the front wheel valve unit 18a, the first port 18a1 is positioned at a first end of the main flow path channel 20, and a second port 18a2 is positioned at a second end of the main flow path channel 20. Two secondary flow path channels 22 are formed inside the front wheel valve unit 18a in such a way as to branch off from the main flow path channel 20. A first end of the vehicle height adjustment valve 14FR is connected to one of the secondary flow path channels 22, and a second end of the vehicle height adjustment valve 14FR is connected to the air spring 12FR via a third port 18a3. Similarly, a first end of the vehicle height adjustment valve 14FL is connected to the other secondary flow path channel 22, and a second end of the vehicle height adjustment valve 14FL is connected to the air spring 12FL via a fourth port 18a4.

A main communication flow path 16a (the main flow path 16) is connected to the second port 18a2. The main communication flow path 16a is connected to a first port 18b1 of the rear wheel valve unit 18b. The main flow path channel 20 is formed inside the rear wheel valve unit 18b, and the first port 18b1 is positioned at a first end of the main flow path channel 20. Two secondary flow path channels 22 are also formed inside the rear wheel valve unit 18b in such a way as to branch off from the main flow path channel 20. A first end of the vehicle height adjustment valve 14RR is connected to one of the secondary flow path channels 22, and a second end of the vehicle height adjustment valve 14RR is connected to the air spring 12RR via a second port 18b2. A first end of the vehicle height adjustment valve 14RL is connected to the other secondary flow path channel 22, and a second end of the vehicle height adjustment valve 14RL is connected to the air spring 12RL via a third port 18b3.

In the example illustrated in FIG. 1, the front wheel valve unit 18a with four ports is used, and the rear wheel valve unit 18b with the three ports is used. However, for example, the same valve unit with four ports can be used on both the front wheel side and the rear wheel side. In a case where the same valve unit with four ports as the front wheel valve unit 18a is used as the rear wheel valve unit 18b, a port corresponding to the second port 18a2 is sealed with a plug cap (blind cap). In this case, it is possible to reduce the number of component types, and design costs by adopting the same type of valve units on the front wheel side and the rear wheel side.

The same type of opening and closing valves can be used as the vehicle height adjustment valves 14 (14FR, 14FL, 14RR, 14RL). For example, the vehicle height adjustment valve 14 includes an ON/OFF controlled solenoid and a spring. A normally closed electro-magnetic control valve, which is closed in a case where the solenoid of the control valve is not energized, can be used as any one of the opening and closing valves.

The main flow path 16 is connected to a pressure tank 26 (supply source of the working fluid) via a circuit valve block 24 and a tank connection main flow path 16b. The circuit valve block 24 is connected to an outlet of a compressor unit 30 via a compressor outlet flow path 28a. The circuit valve block 24 is connected to an inlet of the compressor unit 30 via a compressor inlet flow path 28b. The circuit valve block 24 is formed as a valve block including multiple opening and closing valves, for example, four opening and closing valves. Specifically, the circuit valve block 24 is configured to include a first opening and closing valve 24a; a second opening and closing valve 24b; a third opening and closing valve 24c; and a fourth opening and closing valve 24d. The respective first ends of the first opening and closing valve 24a and the second opening and closing valve 24b are connected to the pressure tank 26 via the tank connection main flow path 16b (the main flow path 16). A first end of the third opening and closing valve 24c is connected to the outlet of the compressor unit 30 via the compressor outlet flow path 28a, and is connected to a second end of the second opening and closing valve 24b. A second end of the third opening and closing valve 24c is connected to the air spring 12 (the vehicle height adjustment unit, that is, the front wheel valve unit 18a). A first end of the fourth opening and closing valve 24d is connected to the inlet of the compressor unit 30 via the compressor inlet flow path 28b, and is connected to a second end of the first opening and closing valve 24a. A second end of the fourth opening and closing valve 24d is connected to the air spring 12 (the vehicle height adjustment unit, that is, the front wheel valve unit 18a).

The same type of opening and closing valves can be used as the first opening and closing valve 24a, the second opening and closing valve 24b, the third opening and closing valve 24c, and the fourth opening and closing valve 24d included in the circuit valve block 24. For example, each of the opening and closing valves includes an ON/OFF controlled solenoid, and a spring. A normally closed electromagnetic control valve, which is closed in a case where the solenoid of the control valve is not energized, can be used as any one of the opening and closing valves.

The vehicle height adjustment apparatus 10 in the embodiment includes a first pressure sensor 32a and a second pressure sensor 32b. In the example illustrated in FIG. 1, for example, the first pressure sensor 32a is disposed on the upstream side of the circuit valve block (the multiple opening and closing valves) 24. The second pressure sensor 32b is disposed on the downstream side of the circuit valve block 24. That is, the circuit valve block (valve block) 24 includes the first pressure sensor 32a for detecting the pressure of the pressure tank 26, and the second pressure sensor 32b for detecting the pressure of the air spring 12 (the vehicle height adjustment unit, that is, the front wheel valve unit 18a). For example, the circuit valve block 24 is made of metal or resin. Channels are formed inside the circuit valve block 24 so as to enable the aforementioned connection between the first opening and closing valve 24a, the second opening and closing valve 24b, the third opening and closing valve 24c, and the fourth opening and closing valve 24d. The first pressure sensor 32a is connected to one of the channels through which the first end of the first opening and closing valve 24a or the second opening and closing valve 24b is connected to the tank connection main flow path 16b (the main flow path 16) (in the example illustrated in FIG. 1, the first pressure sensor 32a is connected to a channel extending from the first end of the first opening and closing valve 24a). The second pressure sensor 32b is connected to one of the channels through which the first end of the third opening and closing valve 24c or the fourth opening and closing valve 24d is connected to the main flow path 16 (in the example illustrated in FIG. 1, the second pressure sensor 32b is connected to a channel extending from the first end of the third opening and closing valve 24c).

For example, in a case where the first opening and closing valve 24a and the second opening and closing valve 24b are closed, the first pressure sensor 32a is capable of accurately detecting the static pressure of the pressure tank 26. In a case where at least one of the first opening and closing valve 24a and the second opening and closing valve 24b is opened, and the working fluid flows through the channels, the first pressure sensor 32a is capable of detecting the dynamic pressure of the pressure tank 26. Similarly, in a case where the third opening and closing valve 24c and the fourth opening and closing valve 24d are closed, and at least one of the vehicle height adjustment valves 14FR and 14FL of the front wheels is opened, the second pressure sensor 32b is capable of detecting the static pressure of the air spring 12. In a case where the third opening and closing valve 24c, the fourth opening and closing valve 24d, and the vehicle height adjustment valves 14RR and 14RL are closed, and one of the vehicle height adjustment valves 14FR and 14FL is opened, the second pressure sensor 32b is capable of detecting the static pressure of the corresponding one of the air springs 12FR and 12FL of the front wheels. In a case where both of the vehicle height adjustment valves 14FR and 14FL are opened, the second pressure sensor 32b is capable of detecting an average static pressure of both of the air springs 12FR and 12FL. In a case where the third opening and closing valve 24c, the fourth opening and closing valve 24d, and the vehicle height adjustment valves 14FR and 14FL are closed, and one of the vehicle height adjustment valves 14RR and 14RL is opened, the second pressure sensor 32b is capable of detecting the static pressure of the corresponding one of the air springs 12RR and 12RL of the rear wheels. When both of the vehicle height adjustment valves 14RR and 14RL are opened, the second pressure sensor 32b is capable of detecting an average static pressure of both of the air springs 12RR and 12RL. In a case where the third opening and closing valve 24c and the fourth opening and closing valve 24d are closed, and the vehicle height adjustment valves 14FR, 14FL, 14RR, and 14RL are opened, the second pressure sensor 32b is capable of detecting the static pressure of all of the air springs 12FR, 12FL, 12RR, and 12RL respectively corresponding to all of the wheels. In a case where the third opening and closing valve 24c or the fourth opening and closing valve 24d is opened, the second pressure sensor 32b is capable of detecting the dynamic pressure of the air spring 12 (the vehicle height adjustment units, that is, the front wheel valve unit 18a and the rear wheel valve unit 18b).

As such, the first pressure sensor 32a is capable of detecting the pressure (static pressure or dynamic pressure) of an upstream side (for example, the pressure tank 26) of the circuit valve block 24. The second pressure sensor 32b is capable of detecting the pressure (static pressure or dynamic pressure) of a downstream side (for example, the air spring 12) of the circuit valve block 24. The working fluid flows from the pressure tank 26 to the air spring 12 due to the pressure difference (differential pressure) between the pressure tank 26 and the air spring 12, and thus, the vehicle height can be adjusted, which will be described later. In other words, since a sufficient amount of the working fluid required to adjust the vehicle height does not flow in a case where the pressure difference is small, the driving of the compressor unit 30 is required. The vehicle height adjustment apparatus 10 is capable of acquiring (calculating) the pressure difference (differential pressure) based on detection results from the first pressure sensor 32a and the second pressure sensor 32b, and controlling the driving of the compressor unit 30 using the calculation result. For example, in a case where when vehicle height increasing control is executed, and the pressure difference between the pressure tank 26 and the air spring 12 is a predetermined value (threshold value) or greater, the working fluid is capable of flowing from the pressure tank 26 to the air spring 12 due to the pressure difference. In this case, it is possible not to drive a compressor 36. In contrast, in a case where the pressure difference between the pressure tank 26 and the air spring 12 is less than the predetermined value (the threshold value), and the vehicle height increasing control is continuously executed, the compressor 36 can be driven at that timing (timing at which pressure feeding of the compressor 36 is required).

For example, the pressure tank 26 is made of metal or resin, and has a capacity and sufficient pressure resistance against pressure occurring in the flow path system when vehicle height adjustment control via the air springs 12 is executed or not. The pressure tank 26 includes a relief valve 26b which reduces the internal pressure of a tank body 26a in a case where the internal pressure of the tank body 26a is a set pressure (pressure set in advance by tests or the like) or greater due to an unknown reason.

The compressor unit 30 includes the following main configuration elements: the compressor 36 driven by a motor 34; a dryer 38; and a throttle mechanism 40 configured to include an orifice 40a and a check valve 40b. In the example illustrated in FIG. 1, the compressor unit 30 further includes a relief valve 42; check valves 44, 46, and 48; filters 50 and 52; and the like.

In a case where the pressure difference between the pressure tank 26 and the air spring 12 is the predetermined valve (value set in advance via tests or the like) or less during vehicle height increasing control, or in a case where the working fluid is pumped (is returned) into the pressure tank 26 from the air spring 12 during vehicle height decreasing control, the compressor 36 of the compressor unit 30 is operated by the motor 34 to pressure-feed the working fluid. The vehicle height adjustment apparatus 10 in the embodiment is a closed type apparatus that adjusts the vehicle height by moving the working fluid in the flow paths (air which has been initially sealed in the flow paths when the vehicle height adjustment apparatus 10 is built) between the pressure tank 26 and the air spring 12. Accordingly, basically, it is considered that external air may not infiltrate into the apparatus, and there may be no environmental changes, for example, a humidity change. Accordingly, basically, it is possible to omit the dryer 38 or the throttle mechanism 40 from the closed type apparatus. The working fluid (air) in the apparatus may leak to the outside due to an unknown reason. In this case, the working fluid in the apparatus is supplemented by suctioning the atmosphere (the outside air) from the outside via the filter 52 and the check valve 48. At this time, the atmosphere (the outside air) may contain moisture (humidity) that adversely affects the internal configuration components of the vehicle height adjustment apparatus 10. For this reason, the vehicle height adjustment apparatus 10 illustrated in FIG. 1 includes the dryer 38 and the throttle mechanism 40 on the downstream side of the compressor 36.

The dryer 38 removes a predetermined amount of humidity from the suctioned atmosphere, and the throttle mechanism 40 adjusts the passing speed of the atmosphere passing through the dryer 38. The compressor unit 30 includes the relief valve 42 so as to reduce the internal pressure of the vehicle height adjustment apparatus 10 in a case where the internal pressure of the vehicle height adjustment apparatus 10 exceeds a limit pressure due to an unknown reason. For example, the relief valve 42 includes an ON/OFF controlled solenoid and a spring. A normally closed electro-magnetic control valve, which is closed in a case where the solenoid is not energized, can be used as the relief valve 42. The relief valve 42 in the embodiment is not a valve of the type which always maintains a closed valve state when the valve is not energized. The relief valve 42 includes a check valve 54 that allows the flowing of the working fluid to the atmosphere in a case where the internal pressure of the vehicle height adjustment apparatus 10 exceeds the limit pressure (pressure set in advance via tests or the like). For example, in a case where the internal pressure of the vehicle height adjustment apparatus 10 exceeds the limit pressure due to the occurrence of an unknown malfunction, the check valve 54 is opened which counteracts biasing force, and the internal pressure is automatically reduced to the limit pressure or less. The relief valve 42 can be opened according to control signals from a control unit (to be described later), and is capable of reducing the internal pressure of the vehicle height adjustment apparatus 10, regardless of the limit pressure. The compressor 36 also serves as a supply source supplying the working fluid to the air springs 12.

The vehicle height adjustment apparatus 10 with this configuration executes control related to vehicle height adjustment of the vehicle height adjustment units (the air springs, the vehicle height adjustment valves or the like, which will be described later) via a control unit (ECU) 56 included in the vehicle height adjustment apparatus 10. For example, the ECU 56 is capable of acquiring a vehicle height adjustment demand, a detection result from a vehicle height sensor 58 detecting an (vehicle height) extended and contracted state (vehicle height information) of each of the air springs 12, and detection results from the first pressure sensor 32a and the second pressure sensor 32b via a controller area network (CAN). The ECU 56 controls the opening and closing of the vehicle height adjustment valves 14FR, 14FL, 14RR, 14RL, the first opening and closing valve 24a, the second opening and closing valve 24b, the third opening and closing valve 24c, the fourth opening and closing valve 24d, the relief valves 42, and the like, or controls the driving of the motor 34, based on the acquired information. In the example illustrated in FIG. 1, the single ECU 56 integrally controls each control target. However, a control unit may be provided to individually control each control target. Alternatively, control units may be provided to respectively control groups of several control targets, and a host control unit may be provided to integrally control the control units.

The vehicle height sensor 58 is individually disposed in each of the air springs 12, and detects an extended and contracted state of the corresponding air spring 12 as vehicle height information (vehicle height value). The ECU 56 is capable of calculating (acquiring) the value of a vehicle height change per unit time during vehicle height adjustment control, that is, a vehicle height adjustment speed (vehicle height increasing speed) by time-differentiating the vehicle height value acquired by the vehicle height sensors 58. The ECU 56 executes vehicle height adjustment control using the vehicle height value detected by the vehicle height sensors 58 and the vehicle height adjustment speed acquired based on the vehicle height value.

As described above, in the vehicle height adjustment apparatus 10 of the embodiment, the first pressure sensor 32a is disposed on the upstream side of the circuit valve block 24, and the second pressure sensor 32b is disposed on the downstream side of the circuit valve block 24 such that the first pressure sensor 32a and the second pressure sensor 32b are capable of respectively detecting the pressure of the pressure tank 26 and the pressure of the air spring 12. Particularly, the first pressure sensor 32a and the second pressure sensor 32b are capable of detecting pressure in real time during vehicle height increasing control. As a result, the ECU 56 is capable of accurately determining whether or not the flowing of the working fluid caused by the pressure difference can be enabled. In a case where the pressure difference is not sufficient, the ECU 56 is capable of driving the compressor 36 for only a necessary amount of time at a proper timing. As a result, it is possible to optimize control of the driving of the compressor 36, to execute low power consumption control, and to reduce noise or vibration caused by the driving of the compressor 36. The first pressure sensor 32a and the second pressure sensor 32b are capable of respectively detecting the pressure of the pressure tank 26 and the pressure of the air spring 12 in real time, and the detection results can be reflected in control of the vehicle height. For example, as described above, the vehicle height adjustment apparatus 10 is capable of smoothly adjusting the vehicle height at all times by driving the compressor 36 at the proper timing. The vehicle height adjustment apparatus 10 is capable of smoothly adjusting the vehicle height according to road surface conditions. As a result, it is possible to improve riding comfort, or maneuverability.

Since the vehicle height adjustment apparatus 10 is capable of operating the compressor 36 at a proper timing, for example, also in a case where the wheels travel onto a curb or the like, and the vehicle body is inclined in a lateral direction, it is possible to maintain the vehicle body to be in a substantially horizontal state in actuality by properly adjusting the vehicle height, and to reduce the discomfort or anxiety of an occupant and the like. Force exerted (force exerted on a hinge portion) to a door when the door is opened and closed can be maintained at the same level of force as a case where the vehicle body is in a horizontal state, and thus, to easily open and close the door. It is possible to allow the same level of ease of boarding and alighting as a case where the vehicle body is in a horizontal state.

Vehicle height increasing control and vehicle height decreasing control performed by the vehicle height adjustment apparatus 10 with this configuration will be described in detail with reference to FIGS. 2 to 4.

In a description of the operation of the vehicle height adjustment apparatus 10 in a case where the vehicle height increasing control is executed, which will be given with reference to FIG. 2, the pressure of the pressure tank 26 is sufficiently higher than that of the air spring 12, and the working fluid (air) is capable of flowing from the pressure tank 26 to the air spring 12 due to the pressure difference between the pressure tank 26 and the air spring 12. The ECU 56 determines whether or not the flowing of the working fluid (air) caused by the pressure difference can be enabled by acquiring the pressure of the pressure tank 26 based on the detection result from the first pressure sensor 32a, and the pressure of the air spring 12 based on the detection result from the second pressure sensor 32b, and calculating the pressure difference therebetween.

In a case where the vehicle height adjustment apparatus 10 executes vehicle height increasing control, the ECU 56 controls the opening and closing of the first opening and closing valve 24a, the second opening and closing valve 24b, the third opening and closing valve 24c, and the fourth opening and closing valve 24d included in the circuit valve block 24, and executes control such that the vehicle height adjustment valves 14FR, 14FL, 14RR, and 14RL are opened.

The vehicle height adjustment apparatus 10 in the embodiment is capable of switching a flow mode (flow direction, flow rate, or the like) of the working fluid by changing the combination of the respective opening and closing states of the first opening and closing valve 24a, the second opening and closing valve 24b, the third opening and closing valve 24c, and the fourth opening and closing valve 24d of the circuit valve block 24. For example, in a case where the working fluid flows from the pressure tank 26 to the vehicle height adjustment unit (the air spring 12) due to the pressure difference therebetween, the ECU 56 is capable of selectively using at least one of a first flow path system and a second flow path system. The first flow path system is formed by opening the first opening and closing valve 24a and the fourth opening and closing valve 24d, and the second flow path system is formed by opening the second opening and closing valve 24b and the third opening and closing valve 24c. For example, in a case where a first flow mode (ease of flowing associated with the opening diameter of a flow path and flow resistance) of the first flow path system is actually the same as a second flow mode (ease of flowing associated with the opening diameter of a flow path and flow resistance) of the second flow path system, the ECU 56 is considered to select either one of the first flow path system or the second flow path system. In this case, the working fluid flowing out from the pressure tank 26 via the tank connection main flow path 16b can be supplied to each of the air springs 12 in a first speed mode (for example, a low-speed increasing mode) while passing through the first flow path system or the second flow path system. The air springs 12 are extended via opening of the vehicle height adjustment valves 14, and thus, the vehicle height can be increased at a low speed.

In a case where the ECU 56 selects both the first flow path system and the second flow path system, ease of the flowing of the working fluid is substantially two times better than a case where the ECU 56 selects either one of the first flow path system or the second flow path system. The working fluid can be supplied to each of the air springs 12 in a second speed mode (for example, a high-speed increasing mode) which is faster than the first speed mode. As a result, the air springs 12 are extended via opening of the vehicle height adjustment valves 14, and thus, the vehicle height can be increased at a higher speed than the first speed mode.

As such, the ECU 56 is capable of easily switching the flowing of the working fluid (the flow rate of the working fluid) per unit time, and easily changing the vehicle height increasing speed by selecting the first flow path system and the second flow path system. The ECU 56 is capable of adjusting the amount of the working fluid supplied to the air springs 12 by reducing a flow rate via selecting of either one of the first flow path system or the second flow path system. That is, fine adjustment of the internal pressure (spring pressure) of each of the air springs 12 is easily executed. In another embodiment, the first flow mode of the first flow path system specified by the opening of the first opening and closing valve 24a and the fourth opening and closing valve 24d may be set to be different from the second flow mode of the second flow path system specified by the opening of the second opening and closing valve 24b and the third opening and closing valve 24c. For example, the opening diameter of an opening and closing valve of the second flow path system is set to be larger than that of the first flow path system. As a result, in a case where the ECU 56 selects the first flow path system by opening the first opening and closing valve 24a and the fourth opening and closing valve 24d, each of the air springs 12 can be set to the low-speed increasing mode, or fine adjustment of the internal pressure of each of the air springs 12 can be executed. In a case where the ECU 56 selects the second flow path system by opening the second opening and closing valve 24b and the third opening and closing valve 24c, each of the air springs 12 can be set to a medium-speed increasing mode, or medium adjustment of the internal pressure of each of the air springs 12 can be executed. In a case where the ECU 56 selects both the first flow path system and the second flow path system, each of the air springs 12 can be set to the high-speed increasing mode, or high-speed adjustment of the internal pressure of each of the air springs 12 can be executed.

The first flow path system and the second flow path system may be selected multiple times during one vehicle height increasing process. For example, the vehicle height increasing speed in an initial period of a vehicle height increasing operation may be set to the first speed mode in which either one of the first flow path system or the second flow path system is used. The vehicle height increasing speed in an intermediate period may be set to the second speed mode in which both of the first flow path system and the second flow path system are used, and which is faster than the first speed mode. The vehicle height increasing speed in a final period may be set to the first speed mode again. The vehicle height is started to be slowly increased in the first speed mode, thereby being able to reduce a jolt occurring when the vehicle height is started to be increased. The speed mode transitions to the second speed mode in the intermediate period, that is, the vehicle height is increased at a high speed, thereby being able to reduce the amount of time required to complete the vehicle height increasing control. The speed mode is switched to the first speed mode again in the final period, that is, the vehicle height is slowly increased, thereby being able to reduce a jolt occurring when the increasing of the vehicle height is stopped.

Figure 2:
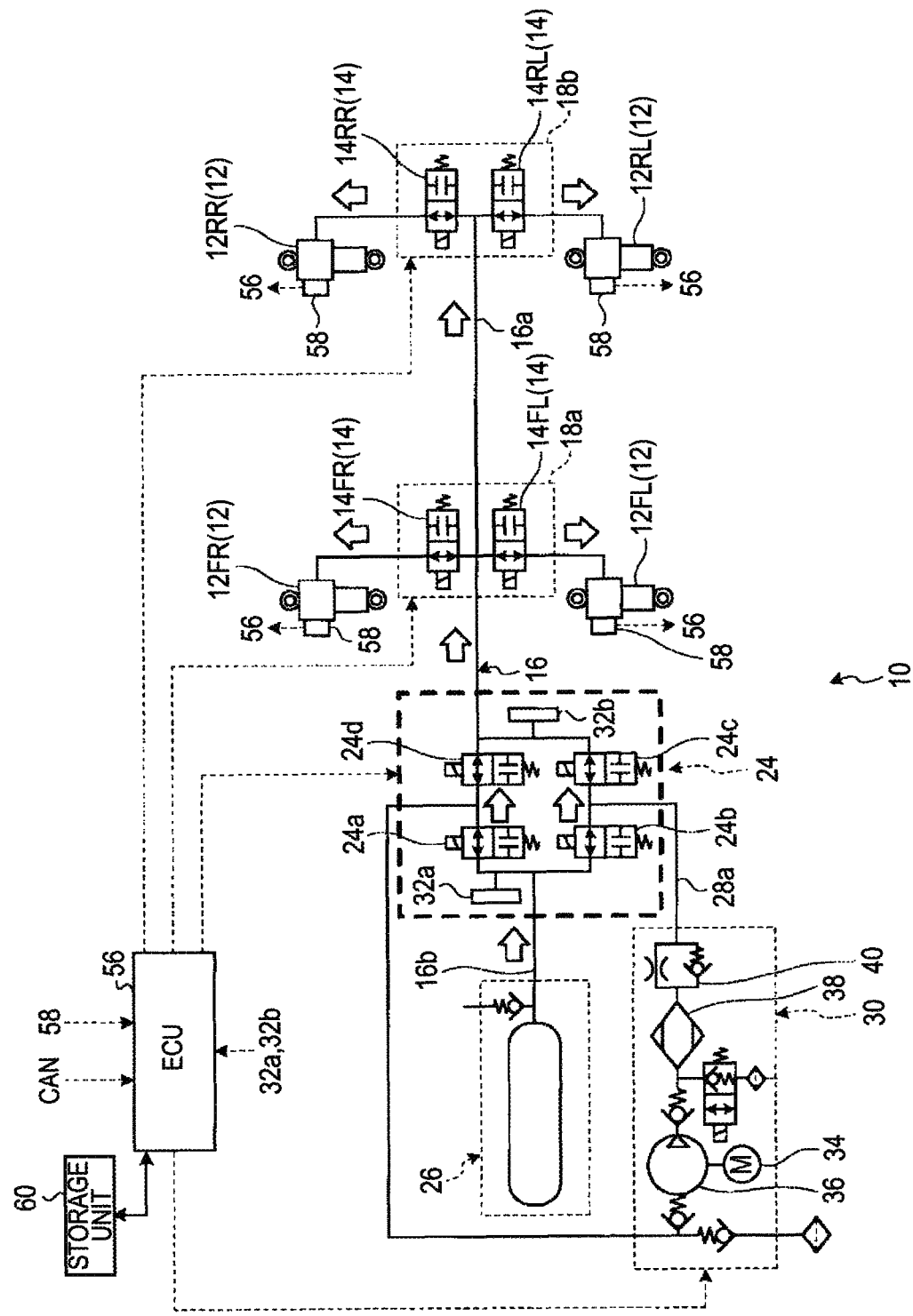
FIG. 2 is a diagram illustrating the state of opening and closing valves and the flow of the working fluid in a case where the vehicle height adjustment apparatus in the embodiment executes vehicle height increasing control without driving a compressor.

As illustrated in FIG. 2, in the vehicle height adjustment apparatus 10 of the embodiment, the second end of the second opening and closing valve 24b and the first end of the third opening and closing valve 24c are connected to the throttle mechanism 40, and the second end of the second opening and closing valve 24b is also connected to the first end of the third opening and closing valve 24c. That is, in a case where the working fluid flows to the air springs 12 based on the pressure difference between the pressure tank 26 and the air springs 12, regardless of the throttle mechanism 40, that is, the compressor unit 30, the working fluid is capable of passing through either one of or both of the first flow path system formed by the first opening and closing valve 24a and the fourth opening and closing valve 24d and the second flow path system formed by the second opening and closing valve 24b and the third opening and closing valve 24c. In other words, in a case where the flowing of the working fluid is enabled due to the pressure difference, the working fluid does not pass through the compressor unit 30. Accordingly, it is possible to simplify the flow path in a case where the flowing of the working fluid is enabled due to the pressure difference, and to reduce the occurrence of pressure loss during flowing of the working fluid.

In the vehicle height adjustment apparatus 10, basically, the working fluid flows to the air springs 12 due to the pressure difference between the pressure tank 26 and the air springs 12. In contrast, as a result of the flowing of the working fluid from the pressure tank 26 to the air springs 12, the pressure difference between the pressure tank 26 and the air springs 12 may disappear such that a sufficient amount of the working fluid does not flow. In addition, when vehicle height increasing control is started, the pressure difference (differential pressure) between the pressure tank 26 and the air springs 12 may not be sufficient. In this case, the ECU 56 drives the motor 34 of the compressor unit 30 such that the compressor 36 forcibly pumps the working fluid from the pressure tank 26, and pressure-feeds the working fluid to the air springs 12.

Figure 3:
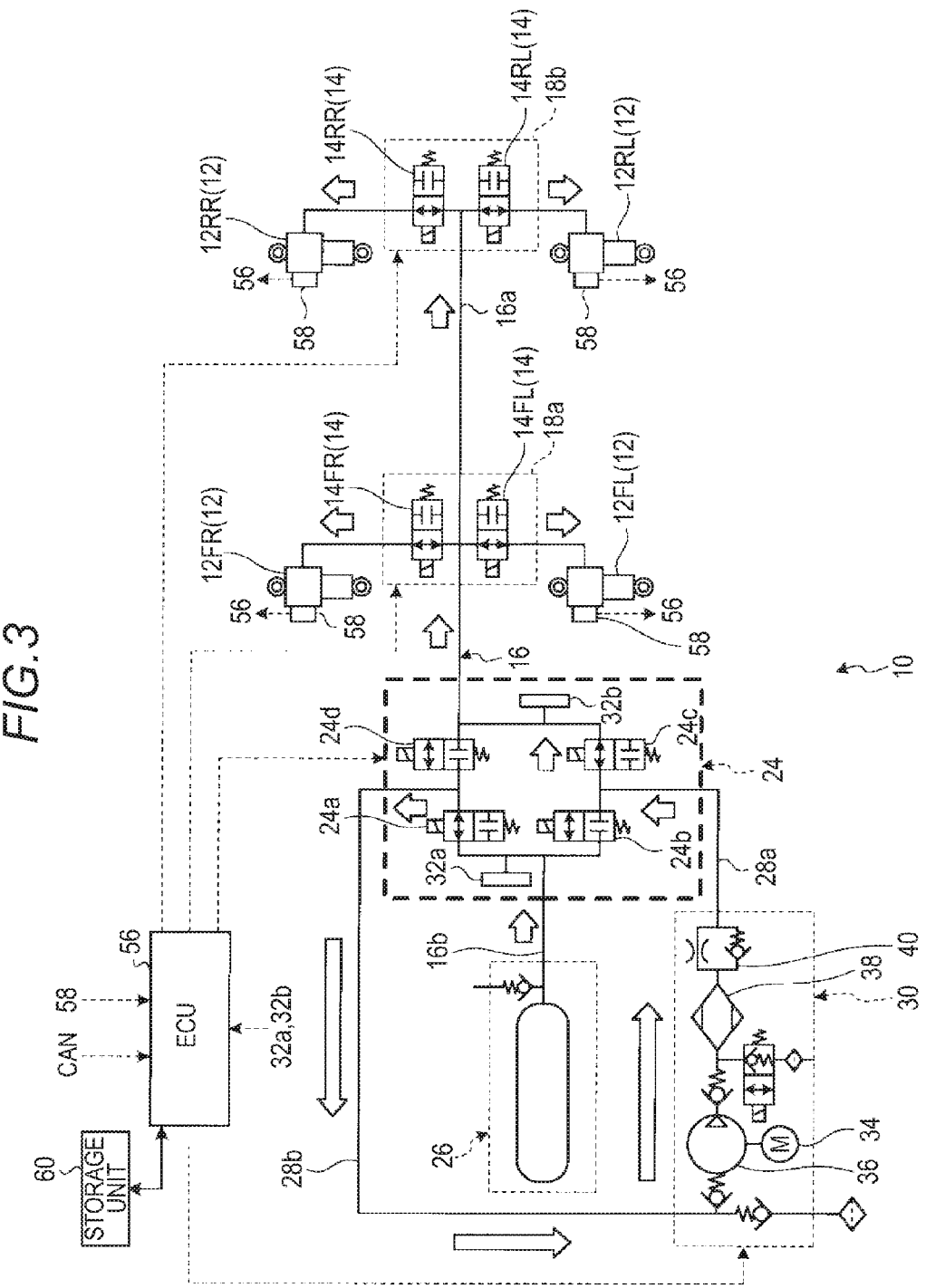
FIG. 3 is a diagram illustrating the state of the opening and closing valves and the flow of the working fluid in a case where the vehicle height adjustment apparatus in the embodiment performs vehicle height increasing control while driving the compressor.

FIG. 3 illustrates the operation of the vehicle height adjustment apparatus 10 in a case where the compressor 36 pressure-feeds the working fluid to the air springs 12 during vehicle height increasing control. For example, in a case where the pressure difference between the pressure tank 26 and the air springs 12 is determined to the predetermined value or less based on detection results from the first pressure sensor 32a and the second pressure sensor 32b, the ECU 56 switches the respective opening and closing states of the first opening and closing valve 24a, the second opening and closing valve 24b, the third opening and closing valve 24c, and the fourth opening and closing valve 24d, and starts to pressure-feed the working fluid via the compressor 36. The predetermined value for the pressure difference used as a trigger to switch the opening and closing states can be determined based on testing carried out in advance and the like. For example, the differential pressure value can be determined to set the vehicle height increasing speed to become less than a predetermined value. In this case, pressure feeding of the compressor 36 is desirably started before the increasing of the vehicle height is stopped.

In another embodiment, pressure feeding of the compressor 36 may be started based on a detection result from the vehicle height sensors 58. That is, a decrease in the pressure difference between the pressure tank 26 and the air spring 12 causes a decrease in the vehicle height increasing speed. Accordingly, in a case where the ECU 56 calculates the vehicle height increasing speed by time-differentiating a vehicle height value from each of the vehicle height sensors 58, and the vehicle height increasing speed is the predetermined value (lower limit increasing speed determined in advance via tests or the like) or less, the ECU 56 may start to pressure-feed the working fluid via the compressor 36. The ECU 56 may determine a start of the driving of the compressor 36 using the detection results from the first pressure sensor 32a and the second pressure sensor 32b and the detection results from the vehicle height sensors 58.

As illustrated in FIG. 3, in a case where a pressure difference calculated based on the detection results from the first pressure sensor 32a and the second pressure sensor 32b is the predetermined value or less, or in a case where the vehicle height increasing speed calculated based on the vehicle height values detected by the vehicle height sensors 58, the ECU 56 opens the first opening and closing valve 24a, and closes the fourth opening and closing valve 24d. In this state, the pressure tank 26 communicates with the compressor 36. The second opening and closing valve 24b is closed, and the third opening and closing valve 24c is opened. In this state, the compressor 36 communicates with the air springs 12. As a result, in a case where the compressor 36 is driven, the working fluid in the pressure tank 26 is pumped into the compressor 36 via the tank connection main flow path 16b, the first opening and closing valve 24a, and the compressor inlet flow path 28b. The pumped working fluid is compressed, and pressure-fed to the air springs 12 via the compressor outlet flow path 28a and the third opening and closing valve 24c. As a result, vehicle height increasing control of each of the air springs 12 can be executed even in a state where the pressure difference between the pressure tank 26 and the air springs 12 is not sufficient. In this case, the vehicle height increasing speed is determined by the output of the compressor 36, that is, the output of the motor 34. For this reason, the ECU 56 controls the output of the motor 34 according to a requested vehicle height increasing speed, for example, a high-speed vehicle height increasing request or a low-speed vehicle height increasing request. As described above, the ECU 56 may control the output of the motor 34 to change the vehicle height increasing speed multiple times in one vehicle height increasing process.

In a case where a pressure difference is present between the pressure tank 26 and the air springs 12, and the weight of the vehicle is increased, for example, the number of users (occupants) of the vehicle is increased, or cargoes are increased, before or during vehicle height increasing control, the magnitude of a load to be carried by the air springs 12 is increased, and thus, the air springs 12 are contracted. As a result, the pressure difference (differential pressure) between the pressure tank 26 and the air spring 12 may disappear due to an increase in the pressure of the air springs 12. Also, in this case, the vehicle height increasing speed is decreased. The situation can be detected based on detection values from the first pressure sensor 32a and the second pressure sensor 32b or detection values from the vehicle height sensors 58. Accordingly, the ECU 56 is capable of starting pressure feeding of the compressor 36 at a proper timing.

Subsequently, the operation of the vehicle height adjustment apparatus 10 during vehicle height decreasing control will be described with reference to FIG. 4. For example, in a case where the ECU 56 acquires a vehicle height decreasing request via the CAN, the ECU 56 switches the respective opening and closing states of the first opening and closing valve 24a, the second opening and closing valve 24b, the third opening and closing valve 24c, and the fourth opening and closing valve 24d. As a result, the compressor 36 is capable of pumping the working fluid from the air springs 12, and returning (pressure-feeding the working fluid to the pressure tank 26) the pumped working fluid to the pressure tank 26, and thus, the air springs 12 are contracted, and the vehicle height can be decreased.

Figure 4:
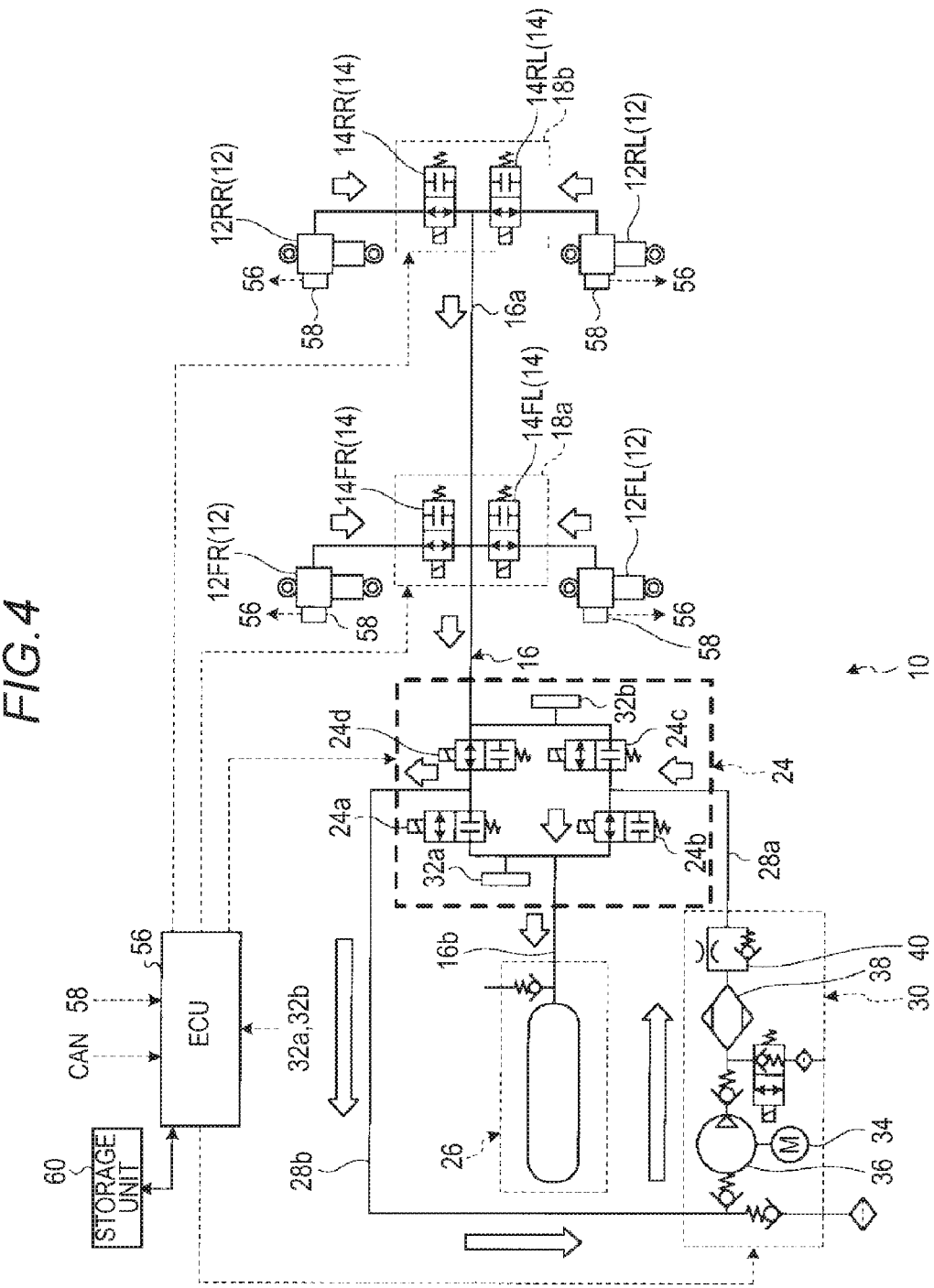
FIG. 4 is a diagram illustrating the state of opening and closing valves and the flow of the working fluid in a case where the vehicle height adjustment apparatus in the embodiment performs vehicle height decreasing control while driving the compressor.

As illustrated in FIG. 4, in a case where the vehicle height decreasing control is executed, the ECU 56 closes the first opening and closing valve 24a, and opens the fourth opening and closing valve 24d. In addition, the second opening and closing valve 24b is opened, and the third opening and closing valve 24c is maintained closed. The vehicle height adjustment valves 14FR, 14FL, 14RR, and 14RL are opened. As a result, the air springs 12 communicate with the compressor 36 via the fourth opening and closing valve 24d and the compressor inlet flow path 28b. The outlet of the compressor 36 communicates with the pressure tank 26 via the compressor outlet flow path 28a, the second opening and closing valve 24b, and the tank connection main flow path 16b. The working fluid of the air springs 12 is pumped and pressure-fed to the pressure tank 26 by the compressor 36.

In the vehicle height decreasing control, the vehicle height decreasing speed is dependent on the pumping speed of the working fluid pumped by the compressor 36. That is, since the ECU 56 is capable of arbitrarily adjusting the output of the motor 34, the ECU 56 is capable of arbitrarily selecting the vehicle height decreasing speed. Accordingly, the ECU 56 increases the output of the motor 34 in a case where the vehicle height decreasing speed is desired to be increased, and the ECU 56 decreases the output of the motor 34 in a case where the vehicle height decreasing speed is desired to be decreased. For example, in a case where occupants including a driver park (stop), and move away from a vehicle, the occupants may be notified that the vehicle is transitioned to a resting state. In this case, it is possible to show the vehicle in a resting state by quickly decreasing the vehicle height to a vehicle height lower than a normal vehicle height while the occupants including the driver stay in the vicinity of the vehicle, for example, within a few seconds after the driver turns off a drive source of the vehicle, alights the vehicle, and locks the doors. In a case where stable travelling can be obtained by decreasing the vehicle height during travelling, it is possible to decrease the vehicle height in a speed range in which occupants do not have the discomfort while stable travelling is maintained.

The ECU 56 is capable of adjusting the decreased amount of the vehicle height by controlling a drive period of the compressor 36. For example, it is possible to make the silhouette of a parked or stopped vehicle look beautiful by decreasing the vehicle height in a case where occupants including a driver park (stop), and move away from the vehicle. The decreasing of the vehicle height is capable of contributing to suppression of a theft of the wheels or the vehicle. In a case where vehicle height decreasing control is executed, the occurrence of damage to the vehicle is desirably prevented by detecting whether or not obstacles are present on a surface below the vehicle or in the vicinity of the vehicle.

In a case where the ECU 56 of the vehicle height adjustment apparatus 10 in the embodiment adjusts the vehicle height, first, the ECU 56 acquires a target vehicle height, and supplies and discharges a predetermined amount of the working fluid to the air springs 12 by executing opening and closing control of the circuit valve block 24 or the opening and closing valves such as the vehicle height adjustment valves 14 in order for extended and contracted states (actual vehicle height) of the air springs 12 to reach the target vehicle height. In this case, since the air springs 12 are extended and contracted by supply and discharge of the working fluid according to a speed, even after the opening and closing valves are controlled, the working fluid may flow through the flow paths, and the air springs 12 may be extended and contracted. That is, the actual vehicle height may overshoot the target vehicle height.

Figure 5:
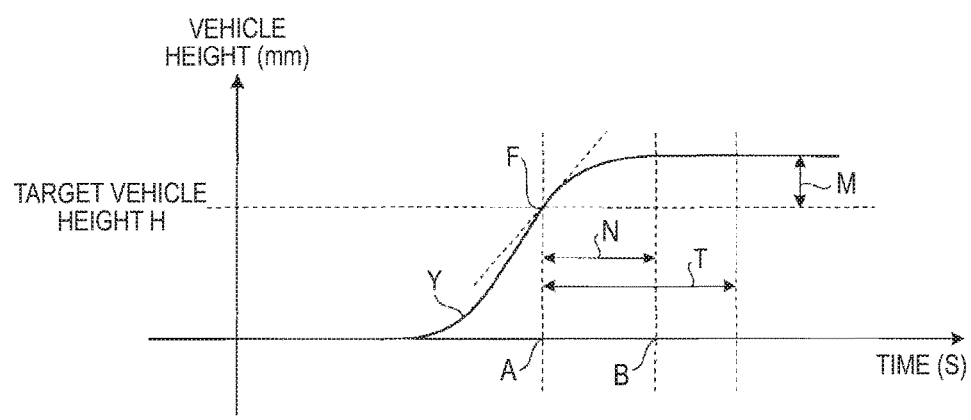
FIG. 5 is a graph illustrating a change in an actual vehicle height during current (first) vehicle height control.

FIG. 5 is a graph illustrating a change in an actual vehicle height Y in a case where the vehicle height is increased. As illustrated in FIG. 5, in a case where a target vehicle height H is set, and based on a vehicle height value provided from the vehicle height sensors 58, the ECU 56 closes the circuit valve block 24 or the opening and closing valves such as the vehicle height adjustment valves 14 at time A when the actual vehicle height Y reaches the target vehicle height H, as described above, the flowing of the working fluid is not immediately stopped. As a result, the actual vehicle height Y exceeds the target vehicle height H. That is, overshooting occurs (the amount of overshooting M occurs). Accordingly, in order for the actual vehicle height Y to reach (converge with) the target vehicle height (final target vehicle height) H, the ECU 56 is required to estimate the amount of overshooting occurring after the controlling of the opening and closing valves is stopped, and to supply and discharge the working fluid (to control the opening and closing valves) based on a modified target vehicle height which is a modification (for example, modified to a low vehicle height) of the target vehicle height H.

The air spring 12 may have characteristic variations due to an assembled state (assembly errors) of the air spring 12 in the vehicle, or aging of the air spring 12 over time. That is, characteristics of the air spring 12 during a design phase may be different from characteristics of the air spring 12 when used in actuality. Accordingly, a change in the amount of overshooting may occur when the vehicle height is adjusted. Since the working fluid (for example, air) to extend and contract the air springs is expanded and compressed according to ambient temperature (ambient environment), the amount of overshooting in the same air spring 12 may be changed according to temperature (environment) at which the vehicle height is adjusted. Accordingly, it is desirable to reflect characteristics of the air spring 12 based on most recent behavior of the air spring 12 so as to improve estimation accuracy for the amount of overshooting.

The vehicle height adjustment apparatus 10 of the embodiment includes a storage unit 60 that stores state information indicating a changed state of the actual vehicle height with respect to a target vehicle height (current target vehicle height) after execution of current control by the ECU 56 is ended (refer to FIGS. 1 to 4). The ECU 56 modifies a target vehicle height (subsequent target vehicle height) for the execution of subsequent control based on the state information stored in the storage unit 60, and adjusts the vehicle height. That is, the ECU 56 learns characteristics of overshooting (characteristics of the air spring 12) occurring during first vehicle height control, and executes second or higher vehicle height control based on a modified target vehicle height obtained by reflecting most recent characteristics of the air spring 12 into a modification of the target vehicle height. The executing of such a modification easily brings second or higher vehicle heights close to the initial target vehicle height (non-modified target vehicle height or the final target vehicle height).

As the state information, the storage unit 60 may store a convergence time (convergence time of overshooting) N from when the controlling of the circuit valve block 24 or the vehicle height adjustment valves 14 by the ECU 56 is ended to a time when a changed vehicle height converges with a target vehicle height. Since a convergence time N is changed according to the characteristics of the air spring 12, the convergence time N can be used as an item of information indicating a current state of the air spring 12 in which a characteristic change of the air spring 12 caused by the assembling of the air spring 12 or aging of the air spring 12 is reflected. As illustrated in FIG. 5, the convergence time N is the amount of time from time A when the actual vehicle height Y reaches the target vehicle height to a time when the vehicle height is stabilized, for example, the amount of time from time A to time B when the vehicle height detected by the vehicle height sensors 58 is stabilized (fixed). It is possible to calculate the convergence time N from a vehicle height value, which is detected by the vehicle height sensors 58, according to Expression (1).

$$N = N\text{memo} + (M/F) \qquad (1)$$

"N" represents the convergence time of overshooting during current vehicle height control. "Nmemo" represents a previous convergence time during previous vehicle height control, and a value stored in the storage unit 60. Accordingly, in a case where the convergence time N is calculated during first vehicle height control, the value of the previous convergence time Nmemo is "0". "M" represents the amount of overshooting during the current vehicle height control, and the difference between the actual vehicle height Y measured by the vehicle height sensors 58 and the target vehicle height H. The amount of overshooting M differs according to the pressure of the pressure tank (supply source) 26 when vehicle height control is executed. For example, in a case where the pressure of the pressure tank 26 is a first sufficiently high pressure, when the circuit valve block 24 or the vehicle height adjustment valves 14 are closed (increasing control is ended), the flow speed of the working fluid is high, and the vehicle height increasing speed is high. That is, the amount of overshooting is increased, and thus, the amount of time until the vehicle height is stabilized is increased, and the convergence time is increased. In contrast, the working fluid is capable of flowing due to the differential pressure between the pressure tank 26 and the air springs 12. In a case where the pressure of the pressure tank 26 is a second pressure lower than the first pressure, when the circuit valve block 24 or the vehicle height adjustment valves 14 are closed (increasing control is ended), the flow speed of the working fluid is decreased, and the vehicle height increasing speed is decreased. That is, the amount of overshooting is decreased, and the convergence time until the vehicle height is stabilized is decreased. Accordingly, a confirmation time T required to confirm the amount of overshooting which is used to calculate the convergence time N in FIG. 5, that is, an acquisition time required to acquire the convergence time is changed according to the pressure of the pressure tank 26. It is possible to efficiently detect the amount of overshooting within a proper time by changing the confirmation time T according to vehicle height adjustment conditions. "F" represents the displacement speed (change speed) of the air springs 12 when the circuit valve block 24 or the vehicle height adjustment valves 14 are controlled by the ECU 56, and the supply and discharge of the working fluid to the air springs 12 is ended in terms of control. That is, "F" represents the displacement speed at the start of overshooting. In this case, the ECU 56 time-differentiates a vehicle height value acquired by the vehicle height sensors 58 when vehicle height control is ended (when a signal for closing the opening and closing valves is output) such that the ECU 56 is capable of calculating (acquiring) a vehicle height adjustment speed (vehicle height increasing speed) when the vehicle height control is ended. The convergence time of overshooting represents state information indicating the amount of time required for the ending (convergence) of the overshooting when vehicle height control at a vehicle height adjustment speed is stopped. The ECU 56 stores the calculated convergence time N in the storage unit 60. Instead of the convergence time N, the storage unit 60 may store another form of information such as the amount of overshooting M and the displacement speed of the air spring 12 for the amount of overshooting M, and may convert the other form of information into a necessary form of information later. In this case, the information stored in the storage unit 60 can be used for other control.

In a case where the ECU 56 executes subsequent (second) vehicle height control, the ECU 56 modifies the target vehicle height based on the convergence time N stored in the storage unit 60. For example, in a case where the actual vehicle height Y considerably overshoots the target vehicle height H during current (first) vehicle height control, the ECU 56 may forcibly return the vehicle height to the target vehicle height H. That is, the ECU 56 may execute vehicle height decreasing control. In a case where some users alight the vehicle or luggage is loaded onto the vehicle while or after the first vehicle height control is executed, the vehicle height is decreased due to the weight of the users or the luggage. That is, the ECU 56 sets the target vehicle height H suitable for alighting again, and starts second vehicle height control such that the vehicle height reaches the set target vehicle height H. Since a load to be held up by the air springs 12 during the second vehicle height control is different from that of during the first vehicle height control, the amount of overshooting occurring during the second vehicle height control is different from that of during the current (first) vehicle height control. That is, in a case where the vehicle height is brought close to the target vehicle height (final vehicle height) during subsequent vehicle height control, it is necessary to estimate the amount of overshooting in a current state of the air springs 12. In this case, in order to accurately estimate the amount of overshooting, it is necessary to estimate the amount of overshooting including a characteristic change caused by assembly errors or aging of the air springs 12, a change (outside air temperature change) in the surrounding environment, or the like.

As described above, the storage unit 60 stores the convergence time N of the operated air springs 12, which include a characteristic change caused by assembly errors or aging of the air springs 12, a change (outside air temperature change) in the surrounding environment, or the like. Accordingly, it is possible to obtain the estimated amount of overshooting conforming to current behaviors of the air springs 12 by estimating the amount of second overshooting (the estimated amount of overshooting m) based on the convergence time N. Specifically, the estimated amount of overshooting m can be calculated by Expression (2).

$$m = f \times N \quad (2)$$

Figure 6:
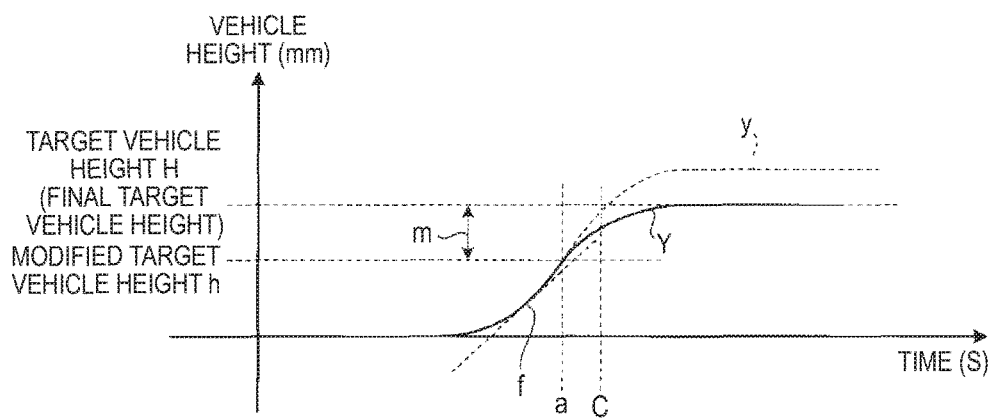
FIG. 6 is a graph illustrating a change in the actual vehicle height during subsequent (second or higher) vehicle height control.

As illustrated in FIG. 6, "f" represents the displacement speed of the air springs 12 during second vehicle height adjustment, and can be acquired by time-differentiating a vehicle height value acquired by the vehicle height sensors 58. As represented by Expression (2), it is possible to calculate the amount of overshooting (the estimated amount of overshooting m) in a case where the vehicle height is increased to the target vehicle height based on current characteristics of the air springs 12. That is, the estimated amount of overshooting m represents the amount of overshooting in a case where the vehicle in a current loaded state is held up based on the current characteristics of the air springs 12. In a case where, while the estimated amount of overshooting m is taken into consideration, the controlling of the circuit valve block 24 or the vehicle height adjustment valves 14 is ended before the target vehicle height H, the actual vehicle height Y overshoots but is close to the non-modified target vehicle height (final vehicle height) H. In this case, a modified target vehicle height h can be calculated by Expression (3).

$$h = H - m \quad (3)$$

As illustrated in FIG. 6, since the estimated amount of overshooting m is subtracted from the target vehicle height H, overshooting equivalent to the estimated amount of overshooting m occurs; however, it is possible to stop vehicle height control in order for the vehicle height to reach a vehicle height obtained by subtracting the amount of overshooting from the target vehicle height H. That is, it is possible to bring the actual vehicle height Y close to the final target vehicle height by earlier ending the control to adjust the vehicle to the target vehicle height H.

FIG. 6 illustrates a control end vehicle height (overshooting vehicle height) y in a case where vehicle height control is continuously executed to adjust the vehicle height to the non-modified target vehicle height H. Similar to FIG. 5, since the circuit valve block 24 or the vehicle height adjustment valves 14 are controlled to be closed at time C when the actual vehicle height Y reaches the target vehicle height, the non-modified control end vehicle height y overshoots the target vehicle height H. In contrast, since the ECU 56 calculates the modified target vehicle height h during execution of the second vehicle height control, replaces the target vehicle height H with the modified target vehicle height h, and executes control such that the circuit valve block 24 or the vehicle height adjustment valves 14 are closed at time a when the actual vehicle height Y reaches the modified target vehicle height h, overshooting occurs; however, since the overshooting starts from the modified target vehicle height h, the ECU 56 is capable of suppressing the overshooting of the final target vehicle height (the target vehicle height H which is initially set).

In a case where the vehicle height overshoots the target vehicle height H during the second vehicle height control, the computation of Expression (1) is executed again, and stored contents of the storage unit 60 are updated. That is, the convergence time N of overshooting during the current (second) vehicle height control is calculated based on the amount of overshooting M from the modified target vehicle height h, and the displacement speed F of the air springs 12 at time a when the vehicle height control is ended. In this case, the previous convergence time Nmemo represents the first convergence time N stored in the storage unit 60. In a case where third and higher vehicle adjustment is executed, the estimated amounts of overshooting m and the modified target vehicle heights h are calculated based on the convergence times N which are sequentially updated. As such, it is possible to adjust the vehicle height close to its initial target vehicle height (final target vehicle height) by modifying the target vehicle height based on the state information (the convergence time N) in which the current characteristics of the air springs 12 are reflected. That is, the aforementioned control to forcibly return the vehicle height to the target vehicle height H is not required.

Figure 7:
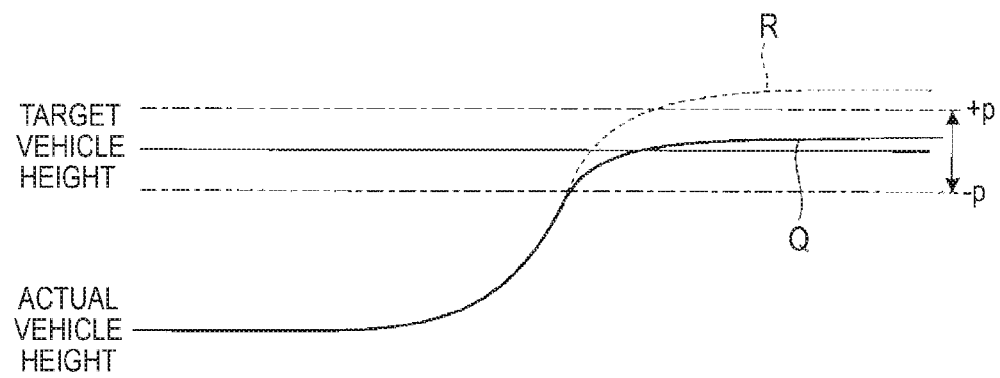
FIG. 7 is a graph illustrating a state where an allowable vehicle height is set with respect to a target vehicle height.

As illustrated in FIG. 7, an allowable vehicle height P is set for the target vehicle height H. That is, excessively sensitive detection of overshooting is prevented by providing a vehicle height range of ±P for the target vehicle height H. For example, a case where the vehicle height is slightly changed due to an external disturbance is not erroneously determined as overshooting. Accordingly, in a case where the actual vehicle height exceeds the allowable vehicle height determined for the target vehicle height, the ECU 56 determines that overshooting has occurred, and updates the state information stored in the storage unit 60.

The control sequence of vehicle height control of the vehicle height adjustment apparatus 10 with the aforementioned configuration will be described with reference to the flowcharts in FIGS. 8 and 9. First, calculation of the state information (convergence time of overshooting) and a learning sequence will be described with reference to FIG. 8. A process in the flowchart illustrated in FIG. 8 is repeatedly executed at a predetermined control cycle, for example, a control cycle of 10 ms. FIG. 8 illustrates a case in which vehicle height increasing control is executed.

The ECU 56 monitors whether or not vehicle height control is executed in a previous control cycle, and is ended in a current control cycle (S100). That is, the ECU 56 monitors whether or not in the previous control cycle, the circuit valve block 24 or the vehicle height adjustment valves 14 are controlled to be opened, and the working fluid is supplied from the pressure tank 26 to the air springs 12. In addition, the ECU 56 monitors whether or not in the current control cycle, the circuit valve block 24 or the vehicle height adjustment valves 14 are controlled to be closed, and the flowing of the working fluid from the pressure tank 26 to the air springs 12 is shut off in terms of control. In a case where the vehicle height control is executed in the previous control cycle, and is ended in the current control cycle (S100: YES), the ECU 56 sets a learning flag (internal flag) to ON, which indicates that the vehicle height control is being learnt (S102). That is, the actual vehicle height Y reaches the target vehicle height H, and the opening and closing valves are closed. At the same time, the overshooting of the target vehicle height H in the air springs 12 starts. Subsequently, the ECU 56 calculates the displacement speed of the air springs 12 when the control is ended (S104). In this case, the ECU 56 calculates the displacement speed of the air springs 12 by time-differentiating a vehicle height value when the vehicle height control is ended, that is, when the supply of the working fluid to the air springs 12 is ended, among vehicle height values provided from the vehicle height sensors 58.

Subsequently, the ECU 56 acquires the pressure of the pressure tank 26 based on a detection result from the first pressure sensor 32a, and confirms whether or not the pressure of the pressure tank 26 is a predetermined value Q or greater (S106). The predetermined value Q can be determined by tests or the like in advance. In a case where the pressure of the pressure tank 26 is the predetermined value Q or greater (S106: YES), the flow speed of the working fluid supplied to the air springs 12 is a predetermined value or greater, and in a case where the vehicle height overshoots the target vehicle height, the amount of time until the vehicle height is stabilized is increased. In this case, a confirmation time t1, which is longer than a confirmation time t2 selected in a case where the pressure of the pressure tank 26 is less than the predetermined value Q, is selected as the confirmation time T used to confirm the amount of overshooting M (S108). In contrast, in a case where the pressure of the pressure tank 26 is less than the predetermined value Q (S106: NO), the flow speed of the working fluid supplied to the air springs 12 is less than the predetermined value, and in a case where the vehicle height overshoots the target vehicle height, the amount of time until the vehicle height is stabilized becomes shorter than that in the case where the pressure of the pressure tank 26 is the predetermined value Q or greater. In this case, the confirmation time t2 shorter than the confirmation time t1 is selected as the confirmation time T used to confirm the amount of overshooting M (S110).

In a case where the learning flag is set to ON (S112: YES), and the selected confirmation time for overshooting is elapsed (S114: YES), the ECU 56 calculates the amount of overshooting M (S116). In this case, the ECU 56 calculates the amount of overshooting M by calculating the difference between the actual vehicle height Y detected by the vehicle height sensors 58 and the target vehicle height H. In a case where the calculated amount of overshooting M exceeds the allowable vehicle height P illustrated in FIG. 7 (S118: NO), the ECU 56 determines that learning of the vehicle height control is required, calculates the convergence time N of the amount of overshooting M based on Expression (1), and stores (updates) the calculated value in the storage unit 60 (S120). The ECU 56 sets a learning flag (internal flag) to OFF, which indicates that the learning in this control cycle is ended (S122), and ends the process.

In a case where the calculated current amount of overshooting M is within the allowable range (below the allowable vehicle height P) in Step S118 (S118: YES), the ECU 56 determines that the amount of overshooting M occurring is within an allowable range. That is, the ECU 56 determines that the actual vehicle height Y is considered as the final target vehicle height (target vehicle height H). In this case, the ECU 56 determines that it is not necessary to learn the result of the current vehicle height control, and omits an update of learning contents. That is, the ECU 56 maintains previous learning contents, and ends the process in the current control cycle. In a case where the selected confirmation time is not elapsed in S114 (S114: NO), the ECU 56 determines that the vehicle height value is still being changed (the vehicle height is being changed), continues to count an internal timer of the ECU 56 (S124), and ends the process in this control cycle.

In a case where the learning flag is set to OFF in S112 (S112: NO), that is, in a case where the vehicle height control is not ended in this control cycle, or in a case where the vehicle height control is not executed in the previous control cycle, the ECU 56 determines that execution of learning is not required, and ends the process. In a case where the vehicle height control is not ended in the current control cycle in S100, or in a case where the vehicle height control is not executed in the previous control cycle in S100 (S100: NO), the ECU 56 proceeds to Step S112, and executes the steps after Step S112.

As such, the ECU 56 is capable of always executing control based on the latest states of the air springs 12 by updating stored contents of the storage unit 60 based on the state of overshooting in a case where the vehicle height control is ended.

FIG. 9 is a flowchart illustrating the sequence of vehicle height adjustment. In a case where current vehicle height control is second or higher vehicle height control (S200: YES), the ECU 56 calculates the estimated amount of overshooting m by Expression (2) (S202). That is, the ECU 56 obtains the estimated amount of overshooting m conforming to current behaviors of the air springs 12 based on the current displacement speeds (time differential values of vehicle height values) of the air springs 12 and the convergence time N stored in the storage unit 60.

The ECU 56 calculates the modified target vehicle height h based on Expression (3) (S204), and uses the modified target vehicle height h as a target compared to the actual vehicle height Y during the vehicle height control. In a case where the actual vehicle height Y reaches the modified target vehicle height h (S206: YES), the ECU 56 ends the process by ending the vehicle height control via the closing of the circuit valve block 24 or the vehicle height adjustment valves 14 (S208). In this case, the actual vehicle height Y overshoots the modified target vehicle height h; however, since the vehicle height control is switched to control based on the modified target vehicle height h, the vehicle height can be brought close to the final target vehicle height (target vehicle height H), and a vehicle height change can be ended.

In a case where the overshooting of the target vehicle height H in the air springs 12 does not occur after the ECU 56 ends the vehicle height control, the ECU 56 completes the vehicle height control. In a case where overshooting still occurs after the vehicle height control based on the modified target vehicle height is ended, the ECU 56 executes learning based on the amount of overshooting M again, and starts subsequent vehicle height control.

In a case where the actual vehicle height does not reach the modified target vehicle height in S206 (S206: NO), the ECU 56 ends the process, and executes the steps after Step S200 in the subsequent control cycle. In this case, the estimated amount of overshooting m and the modified target vehicle height h are updated according to the displacement speed of the air springs 12. In a case where the vehicle height control is not currently executed in S200, the ECU 56 ends the process in the current control cycle.

In the embodiment, the vehicle height adjustment apparatus 10 equipped with a closed type working fluid supply and discharge system has been described. In another embodiment, for example, this disclosure can also be applied to a vehicle height adjustment apparatus equipped with a so-called open type supply and discharge system which suctions the atmosphere (outside air), compresses the suctioned atmosphere via the compressor 36, and supplies the compressed suctioned atmosphere to the air springs 12 via the pressure tank 26. The same effects can be obtained. This disclosure can also be applied to a vehicle height adjustment apparatus equipped with an open type supply and discharge system including a compressor, a high-pressure tank, and a low-pressure tank. In this type, when vehicle height adjustment control is not executed, the compressor adjusts the pressure of the high-pressure tank or low-pressure tank to a predetermined value. In a case where supply and discharge of a working fluid is required, quick movement of the working fluid is realized due to the differential pressure between the pressure of the air springs 12 and the pressure of the high-pressure tank or low-pressure tank. That is, a pressure difference can always be formed between the tank and the air springs 12, smooth vehicle height control can be enabled, and the same effects as the other embodiment can be obtained.

The aforementioned learning of vehicle height control may be collectively managed for all of the air springs 12. Alternatively, the learning may be individually executed for the individual air spring 12, and the same effects can be obtained. The embodiment illustrates the example in which the vehicle height is increased. Similarly, in a case where the vehicle height is decreased, overshooting may also occur. Also, in this case, similar to the embodiment, it is possible to execute learning such as acquiring current characteristics of the air springs 12, and to reflect the learned characteristics in subsequent vehicle height control. Accordingly, it is possible to obtain the same effects, that is, it is possible to more rapidly bring the actual vehicle height close to the target vehicle height (final target vehicle height) by improving estimation accuracy for the amount of overshooting.

A vehicle height adjustment apparatus according to an aspect of this disclosure includes: a plurality of vehicle height adjustment units that are respectively provided to correspond to wheels of a vehicle body, and change a vehicle height according to supply and discharge of a working fluid; a supply source of the working fluid; a plurality of opening and closing valves interposed between the vehicle height adjustment units and the supply source; a control unit configured to execute vehicle height adjustment via controlling of the opening and closing valves such that the vehicle height of the vehicle height adjustment units reaches a target vehicle height; and a storage unit configured to store state information indicating a changed state of an actual vehicle height with respect to a current target vehicle height after execution of current control by the control unit is ended, in which the control unit modifies a subsequent target vehicle height when subsequent control is executed, based on the state information stored in the storage unit, and executes vehicle height adjustment. According to this configuration, since the subsequent target vehicle height used in subsequent vehicle height adjustment is modified based on the state information in which current states of the vehicle height adjustment units are reflected, the actual vehicle height is easily brought close to its initial target vehicle height during the subsequent control.

In the vehicle height adjustment apparatus according to the aspect of this disclosure, the storage unit may store a convergence time from when the control unit ends the controlling of the opening and closing valves, to a time when a changed vehicle height converges with the target vehicle height. The control unit may modify the subsequent target vehicle height based on the convergence time and the change speed of the actual vehicle height when the subsequent control is executed. According to this configuration, the convergence time of the vehicle height change is used as an item of information indicating current states of the vehicle height adjustment units (state of a vehicle). It is possible to reflect current characteristics of the vehicle height adjustment units by modifying the subsequent target vehicle height based on the convergence time of the vehicle height change.

In the vehicle height adjustment apparatus according to the aspect of this disclosure, the control unit may determine an acquisition time required to acquire the state information according to the pressure of the supply source. According to this configuration, in a case where the pressure of the supply source is high, the flow speed of the working fluid flowing during control is high. As a result, the displacement speed of the vehicle height adjustment units is increased, and the amount of time until the vehicle height is stabilized is increased. In contrast, in a case where the pressure of the supply source is low, the flow speed of the working fluid flowing during control is low. As a result, the displacement speed of the vehicle height adjustment units is decreased, and the amount of time until the vehicle height is stabilized is decreased. That is, it is possible to efficiently acquire a reasonable amount of state information by determining the acquisition time, which is required to acquire the state information, according to the pressure of the supply source.

In the vehicle height adjustment apparatus according to the aspect, in a case where the actual vehicle height for the current target vehicle height exceeds an allowable vehicle height determined for the current target vehicle height, the state information stored in the storage unit may be updated. According to this configuration, in a case where the actual vehicle height for the target vehicle height does not exceed the predetermined allowable vehicle height, it can be considered that the actual vehicle height already reaches the initial target vehicle height. That is, it is considered that a modification of the subsequent target vehicle height is not required. In contrast, it is considered that, in a case where the actual vehicle height exceeds the allowable vehicle height, a modification of the subsequent target vehicle height is required. Accordingly, it is possible to suppress an updating process of the storage unit to the necessary minimum level by determining whether or not the storing of the state information based on the allowable vehicle height is required. As a result, it is possible to improve efficiency of the process and to optimize the process.

The embodiment and the modification examples of this disclosure have been described; however, the embodiment and the modification examples are presented as examples, and are not intended to limit the scope of this disclosure. New embodiments can be realized in various forms, and various omissions, replacements, and changes can be made to this disclosure insofar as the omissions, the replacements, and the changes do not depart from the purport of this disclosure. The embodiment or modifications of the embodiment are included in the scope or the purport of this disclosure, and included in the claims disclosed and the equivalent range thereof.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle height adjustment apparatus comprising:
  a plurality of vehicle height adjustment units that are respectively provided to correspond to wheels of a vehicle body, and change a vehicle height according to supply and discharge of a working fluid;
  a supply source of the working fluid;
  a plurality of opening and closing valves interposed between the vehicle height adjustment units and the supply source;
  a control unit configured to execute vehicle height adjustment via controlling of the opening and closing valves such that the vehicle height of the vehicle height adjustment units reaches a target vehicle height; and
  a storage unit configured to store state information indicating a changed state of an actual vehicle height with respect to a current target vehicle height after execution of current control by the control unit is ended,
  wherein the control unit modifies a subsequent target vehicle height when subsequent control is executed, based on the state information stored in the storage unit, and executes vehicle height adjustment,
  wherein the control unit determines an acquisition time required to acquire the state information according to the pressure of the supply source.

2. The vehicle height adjustment apparatus according to claim 1,
  wherein the storage unit stores a convergence time from when the control unit ends the controlling of the opening and closing valves to a time when a changed vehicle height converges with the target vehicle height, and
  wherein the control unit modifies the subsequent target vehicle height based on the convergence time and the change speed of the actual vehicle height when the subsequent control is executed.

3. The vehicle height adjustment apparatus according to claim 2,
  wherein in a case where the actual vehicle height for the current target vehicle height exceeds an allowable vehicle height determined for the current target vehicle height, the state information stored in the storage unit is updated.

4. The vehicle height adjustment apparatus according to claim 1,
  wherein in a case where the actual vehicle height for the current target vehicle height exceeds an allowable vehicle height determined for the current target vehicle height, the state information stored in the storage unit is updated.

* * * * *